United States Patent
Ikeda

(10) Patent No.: US 10,545,706 B2
(45) Date of Patent: Jan. 28, 2020

(54) IMAGE FORMING APPARATUS, CONTROL METHOD, AND STORAGE MEDIUM STORING PROGRAM

(71) Applicant: CANON KABUSHIKI KAISHA, Tokyo (JP)

(72) Inventor: Atsushi Ikeda, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/116,587

(22) Filed: Aug. 29, 2018

(65) Prior Publication Data

US 2019/0073171 A1 Mar. 7, 2019

(30) Foreign Application Priority Data

Sep. 4, 2017 (JP) ................................ 2017-169570

(51) Int. Cl.
*G06F 3/12* (2006.01)
*G06K 15/00* (2006.01)

(52) U.S. Cl.
CPC .......... *G06F 3/1255* (2013.01); *G06F 3/1205* (2013.01); *G06K 15/4065* (2013.01); *G06F 3/123* (2013.01)

(58) Field of Classification Search
CPC ...... G06F 3/1255; G06F 3/1205; G06F 3/123; G06K 15/4065
USPC ........................................................ 358/1.15
See application file for complete search history.

(56) References Cited

U.S. PATENT DOCUMENTS

2012/0311548 A1* 12/2012 Ko ............................ G06F 8/70
717/140
2015/0015916 A1* 1/2015 Kikuchi ............. G06K 15/1848
358/3.24

FOREIGN PATENT DOCUMENTS

JP 2006-88638 A 4/2006

* cited by examiner

*Primary Examiner* — Moustapha Diaby
(74) *Attorney, Agent, or Firm* — Canon U.S.A., Inc. IP Division

(57) ABSTRACT

Disclosed is a control method for an image forming apparatus including firmware and an application operating on the firmware, the control method including registering a size of a defined sheet in a storage unit in accordance with a user operation under control of the firmware, accepting a selection instruction of the registered size of the defined sheet in accordance with the user operation under control of the application, and control printing using the defined sheet having the size according to the selection instruction under the control of the firmware.

7 Claims, 10 Drawing Sheets

IMAGE FORMING APPARATUS, CONTROL METHOD, AND STORAGE MEDIUM STORING PROGRAM

BACKGROUND

Field of the Disclosure

The present disclosure relates to an image forming apparatus that can operate an arbitrary application on firmware.

Description of the Related Art

Up to now, an image forming apparatus that can operate an arbitrary application on firmware has been proposed. The above-described application includes, for example, an application in which document data is previously registered on a Web page in addition to printing settings such as a sheet size, a printing side, and the number of copies, and the registration is called by a panel of the apparatus at a desired timing by a user, so that printing of a regular size document is controlled.

In the above-described application, in a case where a so-called user-defined sheet which is not a regular sheet is desired to be used, the following step is to be taken. First, the user selects the user-defined sheet as a sheet size in the application and previously registers values of a width and a height of the sheets. Next, the user sets the user-defined sheet in a tray and sets the width and the height of the user-defined sheet set in the tray in a tray setting of an apparatus. When these two setting values of the width and the height are matched with each other, it becomes possible to perform the printing on the desired user-defined sheet for the first time.

This is equivalent to a flow for a user-defined sheet registration in a printer driver on a personal computer (PC) and a sheet size setting in the apparatus. Japanese Patent Laid-Open No. 2006-88638 describes a technology for simplifying the size registration of the user-defined sheet in the PC. According to this technology, the apparatus automatically detects a size of the user-defined sheet to register this size and further transmits the size to a printer driver. The printer driver displays a list of received sheet sizes and registers the sheet size selected by the user.

SUMMARY

In view of the above, according to an aspect of the present invention, there is provided an image forming apparatus including firmware, an application operating on the firmware, a first registration unit configured to register a size of a defined sheet in a storage unit in accordance with a user operation under control of the firmware, a first acceptance unit configured to accept a selection instruction of the size of the defined sheet registered by the first registration unit in accordance with the user operation under control of the application, and a control unit configured to control printing using the defined sheet having the size according to the selection instruction under the control of the firmware.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings.

Figure 1:
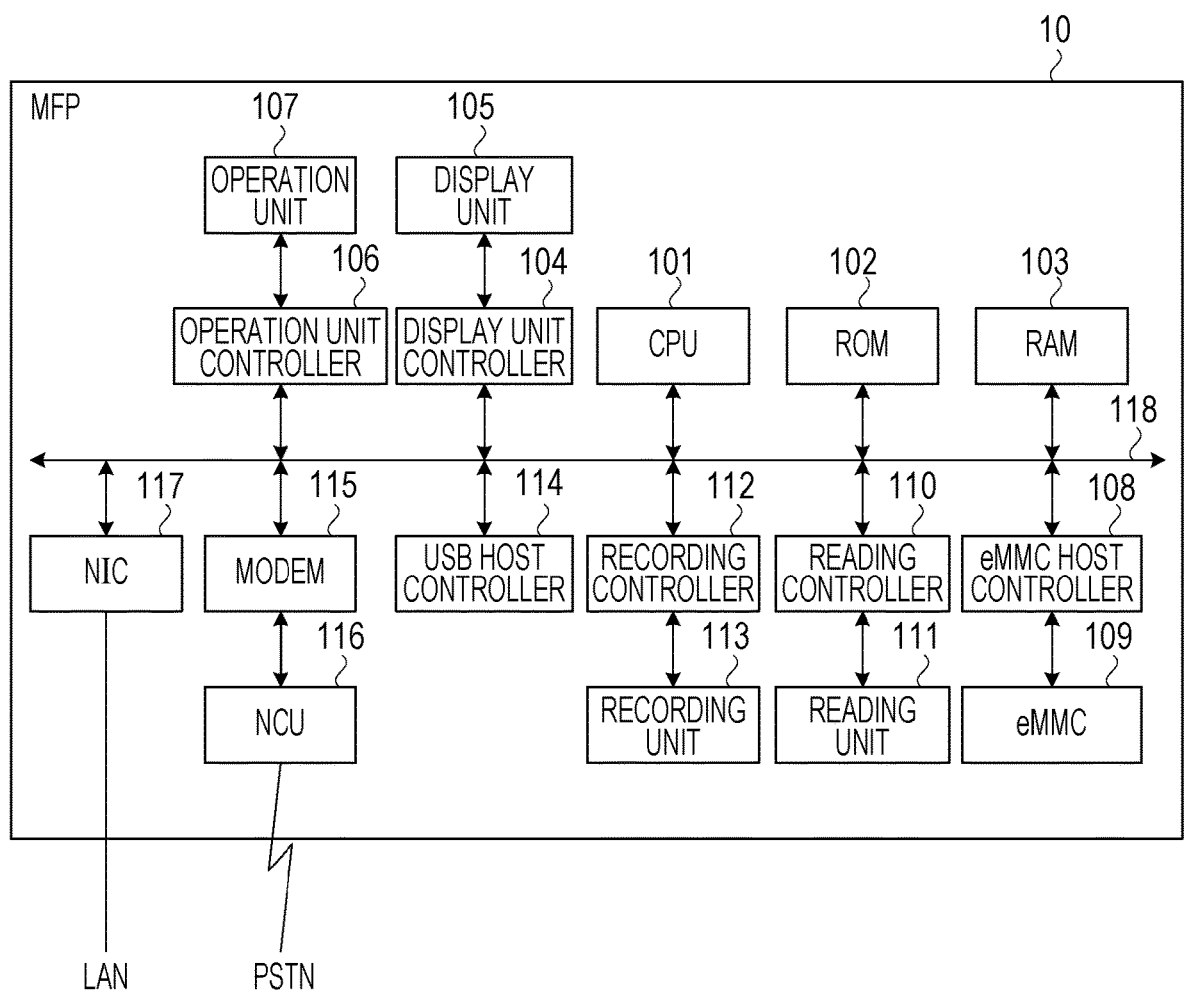
FIG. 1 illustrates a hardware configuration of an MFP.

FIG. 1 illustrates a hardware configuration of a multi-function peripheral (MFP) according to the present exemplary embodiment. It should be noted that the MFP is an example of an image forming apparatus. As illustrated in FIG. 1, an MFP 10 includes a central processing unit (CPU) 101, a read only memory (ROM) 102, a random access memory (RAM) 103, a display unit controller 104, a display unit 105, an operation unit controller 106, and an operation unit 107. The MFP 10 also includes an eMMC host controller 108, an embedded MultiMediaCard (eMMC) 109, a reading controller 110, a reading unit 111, a recording controller 112, and a recording unit 113. The MFP 10 further includes a universal serial bus (USB) host controller 114, a MODEM 115, a network control unit (NCU) 116, and a network interface card (NIC) 117.

The CPU 101 controls the respective devices connected to a system bus 118 in an overall manner. When power is supplied, the CPU 101 executes a boot program stored in the ROM 102. Normally, the boot program loads a main program saved in a storage onto the RAM 103 and jumps to the beginning of the loaded main program. The RAM 103 functions as not only a loading location of the main program but also a work area of the main program and the like. The CPU 101 realizes processing which will be described below by executing various control programs.

The display unit controller 104 controls drawing with respect to the display unit 105. The display unit 105 is a full bitmap liquid crystal display (LCD) of a WVGA size. The operation unit controller 106 controls an input from the operation unit 107 mounted to the MFP. The operation unit 107 is constituted by a touch panel overlapped on the display unit 105. The reading unit 111 performs reading of a document. An auto document feeder (not illustrated) is mounted to the reading unit 111 as an option, and a plurality of documents can be automatically read. The reading unit 111 is connected to the reading controller 110, and the CPU 101 performs exchange with the reading unit 111 via the reading controller 110.

The recording unit 113 forms an image on a recording sheet by an electrophotographic method. The recording unit 113 is connected to the recording controller 112, and the CPU 101 performs exchange with the recording unit 113 via the recording controller 112. The USB host controller 114 governs control based on a USB protocol and intermediates an access to a USB device such as a USB memory (not illustrated).

The MODEM 115 performs modulation and demodulation used for a facsimile (FAX) communication. The MODEM 115 is connected to an NCU 116. A signal modulated by the MODEM 115 is transmitted to a public switched telephone network (PSTN) via the NCU 116. An NIC 117 exchanges data in a bidirectional manner with a main or file server or the like via a LAN. The NIC 117 also exchanges data in a bidirectional manner with a Web server or the like. The MFP 10 according to the present exemplary embodiment is provided with the eMMC 109 as a storage. The CPU 101 accesses the eMMC 109 via the eMMC host controller 108.

Figure 2:
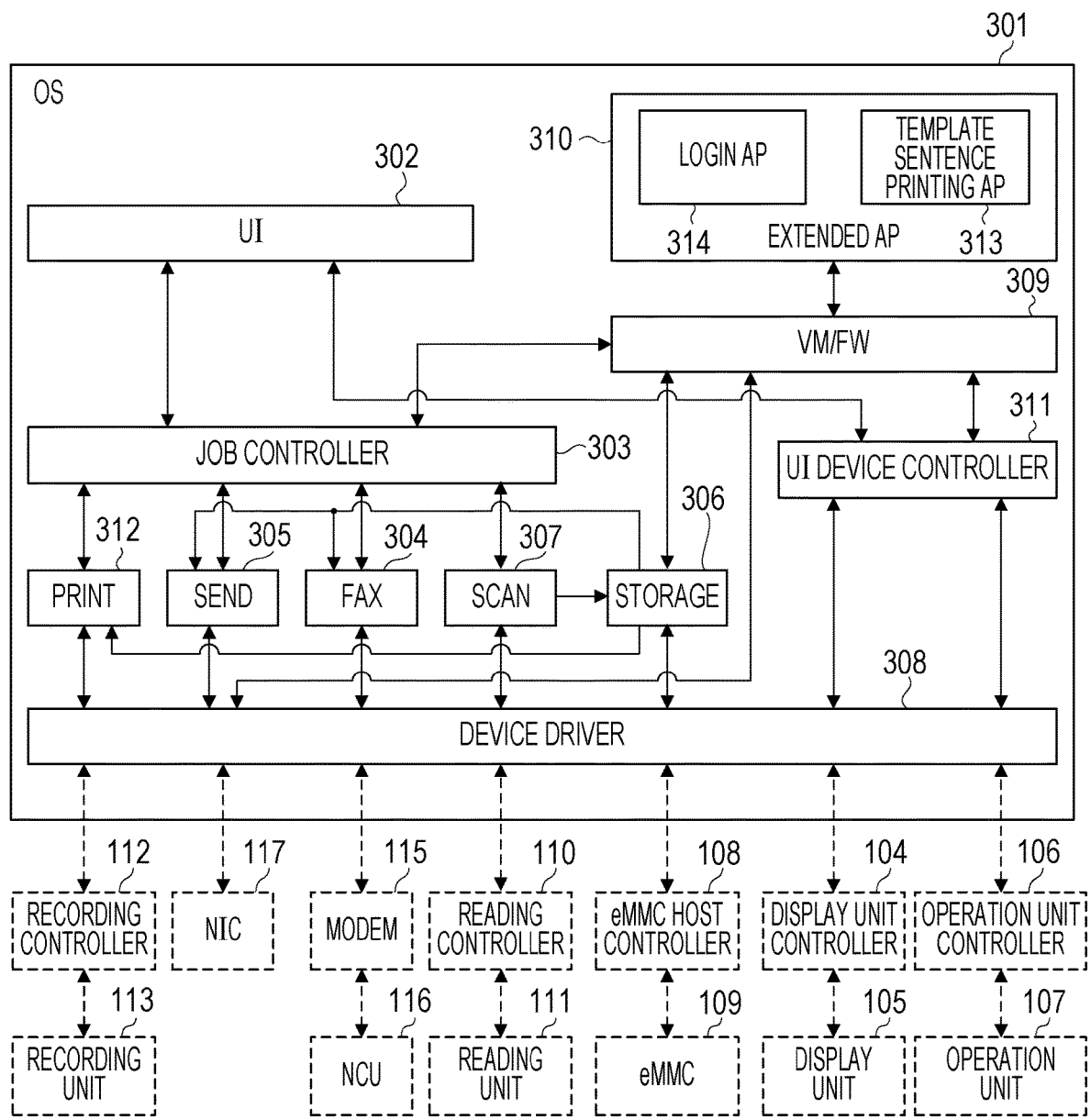
FIG. 2 is a functional configuration diagram of the MFP.

FIG. 2 is a functional configuration diagram of the MFP 10. The respective units indicated by solid lines in FIG. 2 are software modules realized when the CPU 101 executes the main program loaded onto the RAM 103 by the above-described boot program. According to the main program, execution of each of the modules which will be described below is managed and controlled by an operating system (OS) 301. A device driver 308 is combined with the OS 301. The device driver 308 intermediates exchanges with a hardware device such as the display unit controller 104, the operation unit controller 106, or the reading controller 110.

A user interface (UI) 302 provides various information to a user via the display unit 105 and the operation unit 107 and also accepts various instructions from the user. Various settings for switching behaviors of the MFP 10 can also be change by the UI 302. Although not illustrated in the drawings, the various settings changed by the UI 302 are physically stored in the eMMC 109 via a data management module.

A job controller 303 accepts a job such as copying, printing, or fax and controls execution of the accepted job. A storage 306 is, for example, a software module for physically storing data such as images transmitted or received by the facsimile and the user settings in the eMMC 109 to be managed. For example, when the job controller 303 accepts the fax job in the MFP 10 according to the present exemplary embodiment, a scan 307 accepts the job request and controls the reading unit 111 to scan the document. Then, the scan 307 stores the scanned facsimile image data in the storage 306. The facsimile image data stored in the storage 306 is read out by a FAX 304 to be transmitted by the facsimile to an opposite party via the MODEM 115 and the NCU 116. Alternatively, the image data received from the opposite party by the facsimile via the MODEM 115 and the NCU 116 is taken into the FAX 304 and stored in the storage 306.

The MFP 10 according to the present exemplary embodiment includes a virtual machine (VM)/framework (FW) 309. An extended application (AP) 310 is constituted by an arbitrary program written in a script language or the like. For example, Java (registered trademark) serving as an interpreter for interpreting and executing bytecodes or a language system such as Lua may also be used. The extended AP 310 is an example of the application operating on firmware of the image forming apparatus. The VM/FW 309 installs an arbitrary program written in a script language or a predetermined high-level language into the extended AP 310 or uninstalls the program from the extended AP 310. The VM/FW 309 also governs arbitration between a function realized by the arbitrary program installed into the extended AP 310 and an existing function or the like. The VM/FW 309 interprets and executes the written script language. With these processes, the MFP 10 according to the present exemplary embodiment can easily realize arbitrary functions such as a login AP 314 and a printing AP 313 for printing a template sentence while maintaining removability of the functions. A UI device controller 311 intermediates output of various information to the display unit 105 by the UI 302 and the extended AP 310 and transmission of the user operation to the UI 302 and the extended AP 310 by the operation unit 107.

Figure 3:
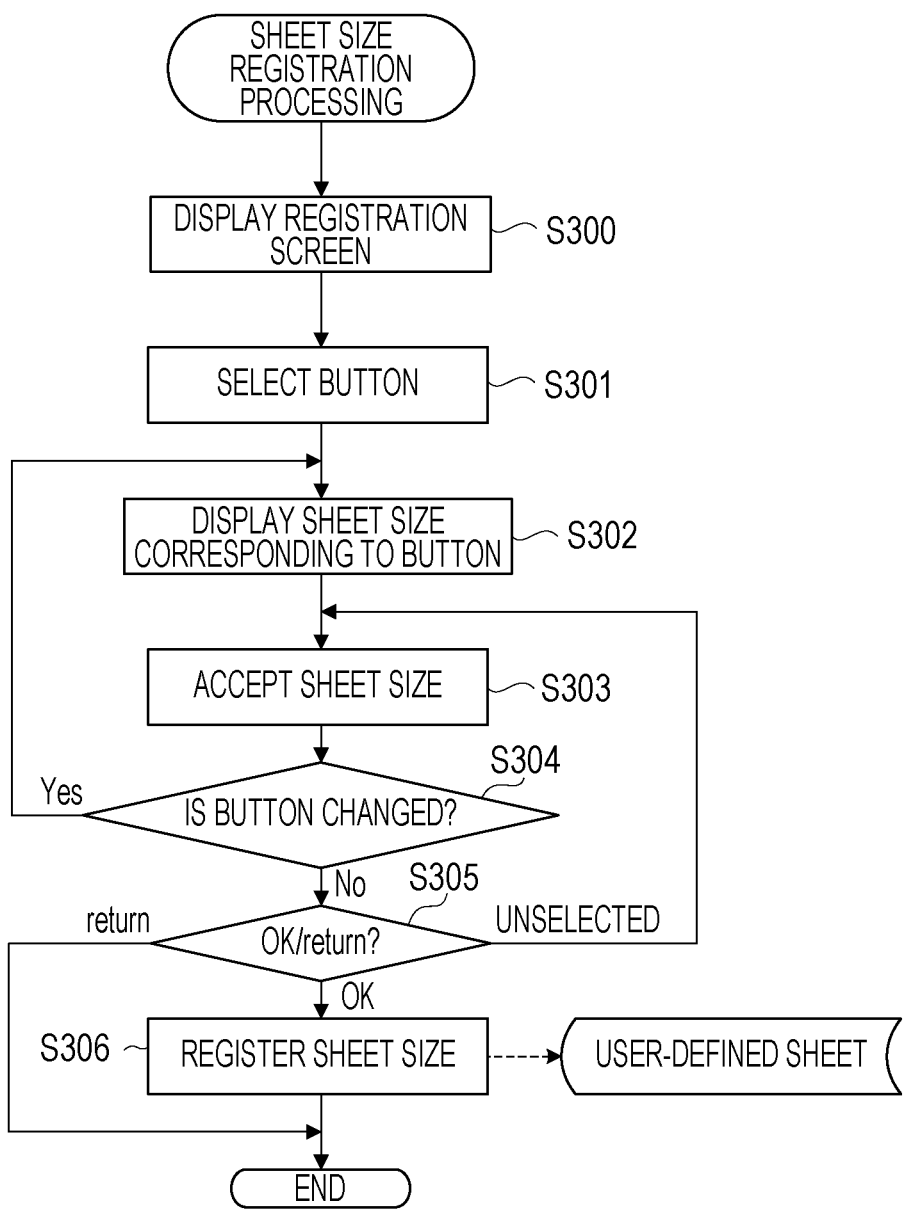
FIG. 3 is a flow chart illustrating sheet size registration processing.
Figure 4:
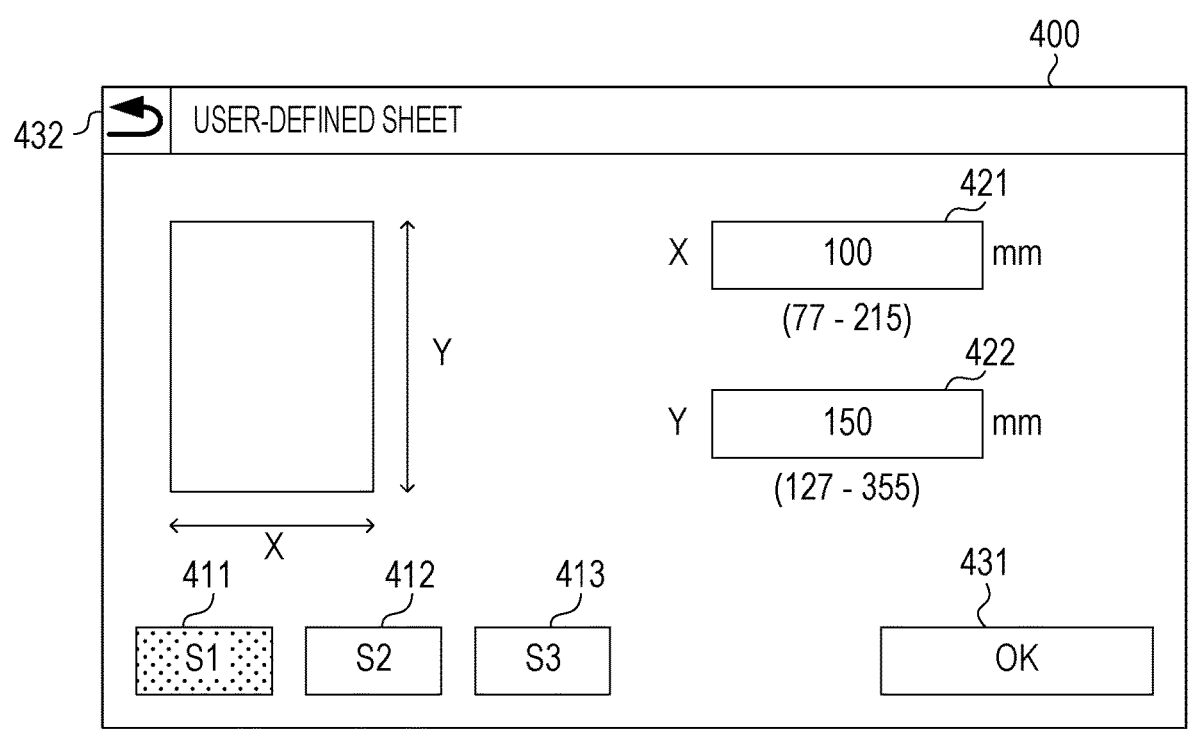
FIG. 4 illustrates an example of a sheet size registration screen.

FIG. 3 is a flow chart illustrating a sheet size registration processing of a user-defined sheet by the MFP 10. It should be noted that the sheet size registration processing is processing realized by the boot program as processing of the UI 302, and is processing executed by the CPU 101. Herein, the boot program is an example of a program of the firmware of the MFP 10. FIG. 4 illustrates an example of a sheet size registration screen displayed on the display unit 105 at the time of the execution of the sheet size registration processing. A plurality of buttons are displayed on a sheet size registration screen 400. In the example of FIG. 4, three buttons including an S1 button 411, an S2 button 412, and an S3 button 413 are displayed. The respective buttons are icons corresponding to numbers assigned to the buttons to be associated with user-defined sheets. It should be noted that, according to the present exemplary embodiment, the MFP 10 can register up to three user-defined sheets, and the three buttons are displayed while corresponding to the three user-defined sheets. It should be noted however that the number of user-defined sheets that can be registered is not limited to the exemplary embodiment, and the number of displayed buttons is not also limited to three to correspond to the user-defined sheets.

Input fields 421 and 422 are further displayed on the sheet size registration screen 400 to input a width (X) and a height (Y) of the sheet as the sheet size. It should be noted that the input fields 421 and 422 are blank at the display starting time on the sheet size registration screen 400. When the user registers the sheet size of the user-defined sheet on the sheet size registration screen 400, the user selects one of the buttons 411 to 413 and inputs the sheet size. With this configuration, the sheet size is registered while being associated with the button number assigned to the selected button.

In S301 of FIG. 3, when one of the buttons 411 to 413 is selected by the user operation on the sheet size registration screen 400, the CPU 101 accepts the selection instruction of the button number assigned to the selected button. This processing is an example of the acceptance processing. Next, in S302, in a case where the sheet size is already associated with the selected button, the CPU 101 displays the associated sheet size on the sheet size registration screen 400. Specifically, the CPU 101 displays the width and the height of the sheet in the input fields 421 and 422 on the sheet size registration screen 400 as the sheet. It should be noted that, in a case where the sheet size is not associated with the selected button, the display of the sheet size in the input fields 421 and 422 is not necessary. In the example of FIG. 4, the S1 button 411 is selected by the user. As the sheet size associated with the S1 button 411, "100 (mm)" is displayed in the input field 421, and "150 (mm)" is displayed in the input field 422. In this state, the user inputs the sheet size desired to be associated with the selected button in the input fields 421 and 422.

In S303, the CPU 101 accepts the sheet size in accordance with the inputs into the input fields 421 and 422. Next, in S304, the CPU 101 checks whether or not the button is changed. For example, when the S2 button 412 is newly selected in a state in which the S1 button 411 is selected, it is determined that the button is changed. In a case where the button is changed (S304: Yes), the CPU 101 advances the processing to S302. In this case, the CPU 101 uses the button after the change as the processing target and performs the processing in S302 and subsequent steps. In a case where the button is not changed (S304: No), the CPU 101 advances the processing to S305.

In S305, the CPU 101 checks whether or not an OK button 431 or a return button 432 is pressed in accordance with the user operation on the sheet size registration screen 400. In a case where the OK button 431 is pressed (S305: OK), the CPU 101 advances the processing to S306. In a case where the return button 432 is pressed (S305: return), the CPU 101 ends the sheet size registration processing. In a case where none of the buttons is pressed (S305: unselected), the CPU 101 advances the processing to S303. In S306, the CPU 101 associates the sheet size input in the input fields 421 and 422 with the button number assigned to the selected buttons 411 to 413 to be stored in a saving area of the user-defined sheet included in the eMMC 109. With this configuration, the user-defined sheet can be identified by the button number. That is, the button number is an example of identification information for identifying the user-defined sheet. In addition, the processing in S306 is an example of registration processing for registering the sheet size in the storage unit while being associated with the identification information. The sheet size registration processing is completed in the above-described manner.

Figure 5:
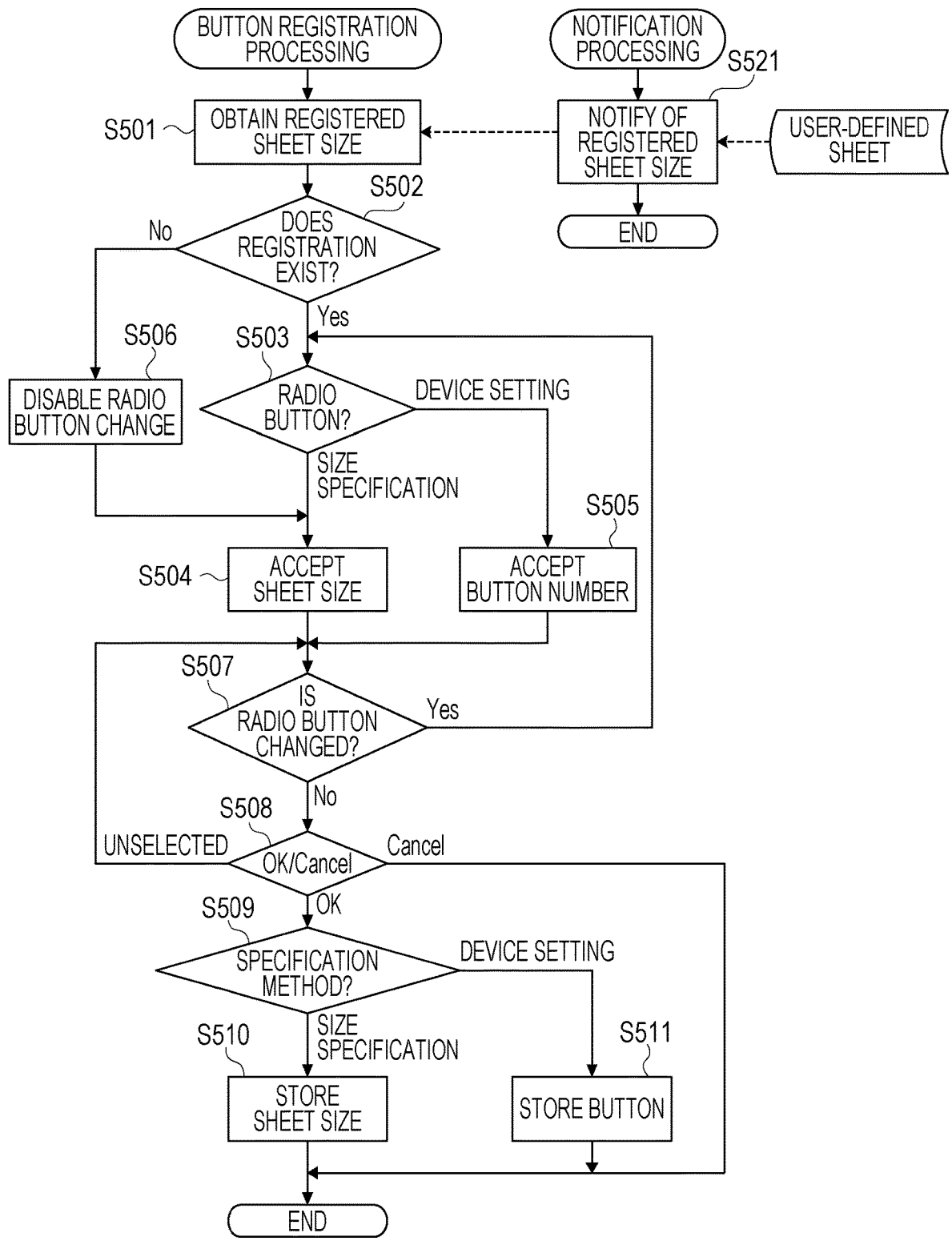
FIG. 5 is a flow chart illustrating processing related to a button registration.
Figure 6:
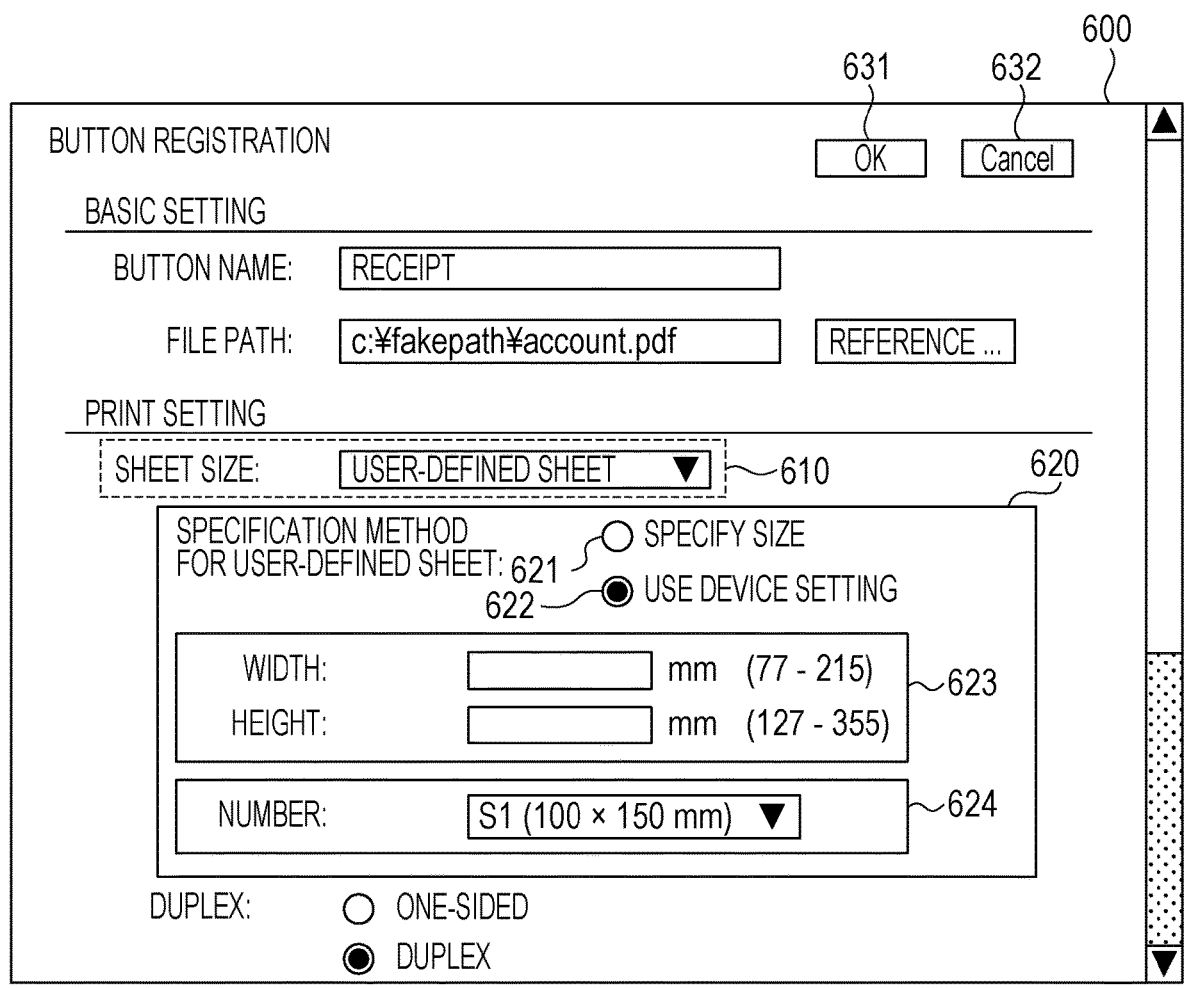
FIG. 6 illustrates an example of a button registration screen.

FIG. 5 is a flow chart illustrating button registration processing provided by an extended application program of the MFP 10 and notification processing provided by the boot program. Herein, the button registration processing is processing interpreted by the VM/FW 309 and executed by the CPU 101 as processing of the printing AP 313 installed into the extended AP 310. On the other hand, the notification processing is processing executed by the CPU 101 as processing of the VM/FW 309. FIG. 6 illustrates an example of a button registration screen 600 displayed on the display unit 105 when the button registration processing is executed. The button registration screen 600 is a Web page created by HTML and displayed by a Web browser.

The user can register a name of the button to be associated with the registered sheet size, a path of a template document file, and the like on the button registration screen 600. Furthermore, a plurality of sheet sizes are displayed in a pull-down format in a sheet size field 610. The sheet size of the user-defined sheet registered in the sheet size registration processing (FIG. 3) is also displayed and can be selected by the user. In a case where the user selects the sheet size of the user-defined sheet in the sheet size field 610, it is possible to perform a setting to a specification field 620 of the sheet size. Two radio buttons 621 and 622 corresponding to "specify size" and "use device setting" are displayed in the specification field 620. In addition, a size input field 623 and a button number selection field 624 are included in the specification field 620.

The button registration processing illustrated in FIG. 5 will be described. In S501, the CPU 101 requests the VM/FW 309 for the sheet size stored in the user-defined sheet saving area of the eMMC 109. The VM/FW 309 reads out the sheet size stored in the user-defined sheet saving area of the eMMC 109 in S521 of the notification processing and returns the sheet size to the extended AP 310. After the processing in S501, in S502, the CPU 101 checks whether or not the sheet size of the user-defined sheet is registered in the eMMC 109. The CPU 101 determines that the registration of the sheet size exists in a case where one or more sheet sizes are obtained in S501. In a case where it is determined that the registration exists (S502: Yes), the CPU 101 advances the processing to S503. In a case where it is determined that the registration does not exist (S502: No), the CPU 101 advances the processing to S506.

In S503, the CPU 101 performs control such that the radio buttons 621 and 622 are displayed to be selectable. Then, the CPU 101 checks whether or not any one of the radio buttons 621 and 622 is selected. In a case where the radio button 621 corresponding to "specify size" is selected (S503: size specification), the CPU 101 advances the processing to S504. In a case where the radio button 622 corresponding to "use device setting" is selected (S503: device setting), the CPU 101 advances the processing to S505.

In S504, the CPU 101 performs control such that the size input field 623 is displayed, and an input can be performed. Then, the CPU 101 accepts the sheet size input in the size input field 623. Thereafter, the CPU 101 advances the processing to S507. In S505, the CPU 101 performs control such that the button number selection field 624 is displayed, and an operation can be performed. The CPU 101 then accepts the selected button number in the button number selection field 624. Thereafter, the CPU 101 advances the processing to S507. It should be noted that a plurality of button numbers are displayed in a pull-down format in the button number selection field 624, and the user can select a desired button number. It should be noted that only the button number associated with the sheet size is displayed in the button number selection field 624 on the sheet size registration screen 400 illustrated in FIG. 4. In addition, the sheet size is displayed together with the button number. In S506, the CPU 101 performs control such that the radio button 622 corresponding to "use device setting" is displayed as not selectable. Thereafter, the CPU 101 advances the processing to S504.

In S507, the CPU 101 checks whether or not the selection of the radio buttons 621 and 622 is changed. In a case where the selection of the radio buttons 621 and 622 is changed (S507: Yes), the CPU 101 advances the processing to S503. In a case where the selection of the radio buttons 621 and 622 is not changed (S507: No), the CPU 101 advances the processing to S508. In S508, the CPU 101 checks whether or not an OK button 631 or a cancel button 632 is pressed on the button registration screen 600. In a case where the OK button 631 is selected (S508: OK), the CPU 101 advances the processing to S509. In a case where the cancel button 632 is selected (S508: cancel), the CPU 101 ends the button registration processing. In a case where none of the OK button 631 and the cancel button 632 is selected (S508: unselected), the CPU 101 advances the processing to S507.

In S509, the CPU 101 checks a specification method for the user-defined sheet. In a case where the radio button 621 corresponding to "specify size" is selected (S509: size specification), the CPU 101 advances the processing to S510. In a case where the radio button 622 corresponding to "use device setting" is selected (S509: device setting), the CPU 101 advances the processing to S511. In S510, the CPU 101 stores the sheet size (width and height) input in the size input field 623 in the storage 306 together with the button name, the file path, and the specification method for the user-defined sheet (size specification) and ends the button registration processing. On the other hand, in S511, the CPU 101 stores the selected button number in the button number selection field 624 in the storage 306 together with the button name, the file path, and the specification method for the user-defined sheet (device setting) and ends the button registration processing. Herein, the button name is information associated with the user-defined sheet via the button number, and the user-defined sheet can be identified by the button name. That is, the button name is an example of the identification information for identifying the user-defined sheet. In addition, the processing in S511 is an example of the registration processing for registering the identification information of the defined sheet while being associated with the sheet size of the user-defined sheet.

Figure 7:
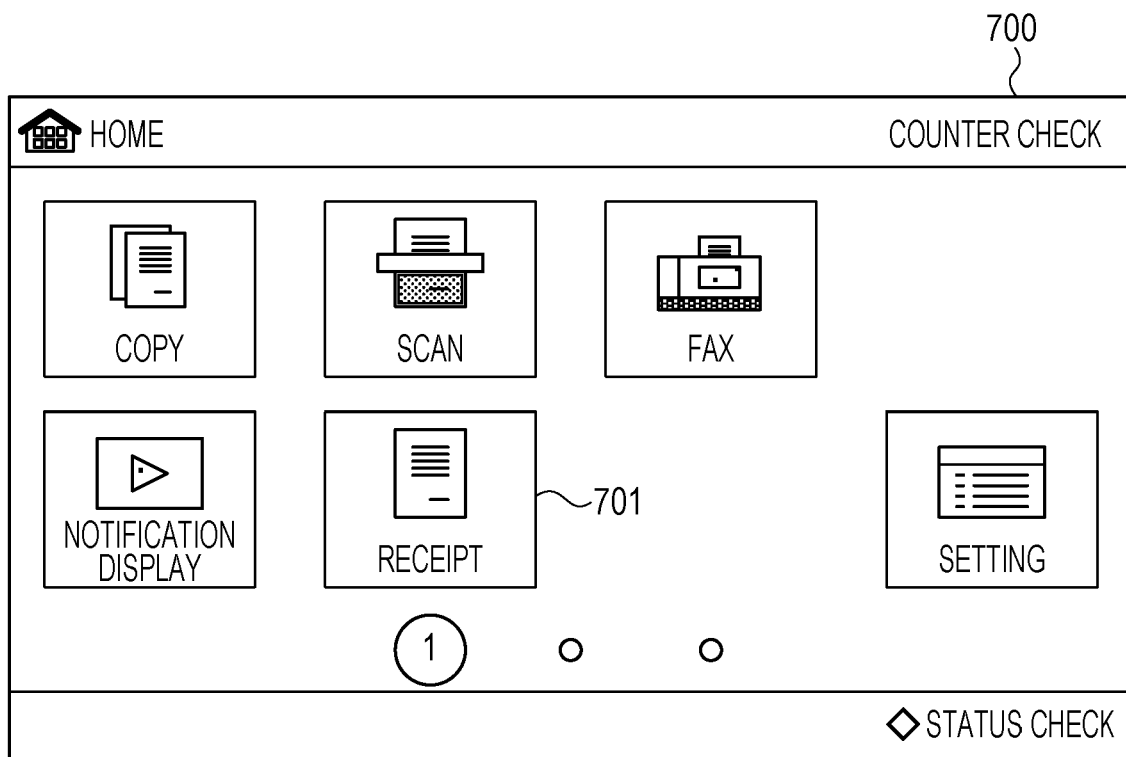
FIG. 7 illustrates an example of a home screen.

When the button registration processing is completed, a button of the user-defined sheet registered in the button registration processing is displayed on a home screen. FIG. 7 is an example of a home screen to which a button of the user-defined sheet is added. A button 701 of the user-defined sheet is displayed on a home screen 700. Processing for displaying the button 701 is performed as follows. That is, the printing AP 313 installed into the extended AP 310 requests the UI 302 to display the button via the VM/FW 309 when the button registration processing is completed. The UI 302 displays the button 701 on the home screen 700 in accordance with the request. For example, as illustrated in FIG. 6, in a case where "receipt" is registered as the button name, the button name "receipt" is displayed in addition to an icon previously embedded in the printing AP 313 as in the button 701 of FIG. 7.

Figure 8:
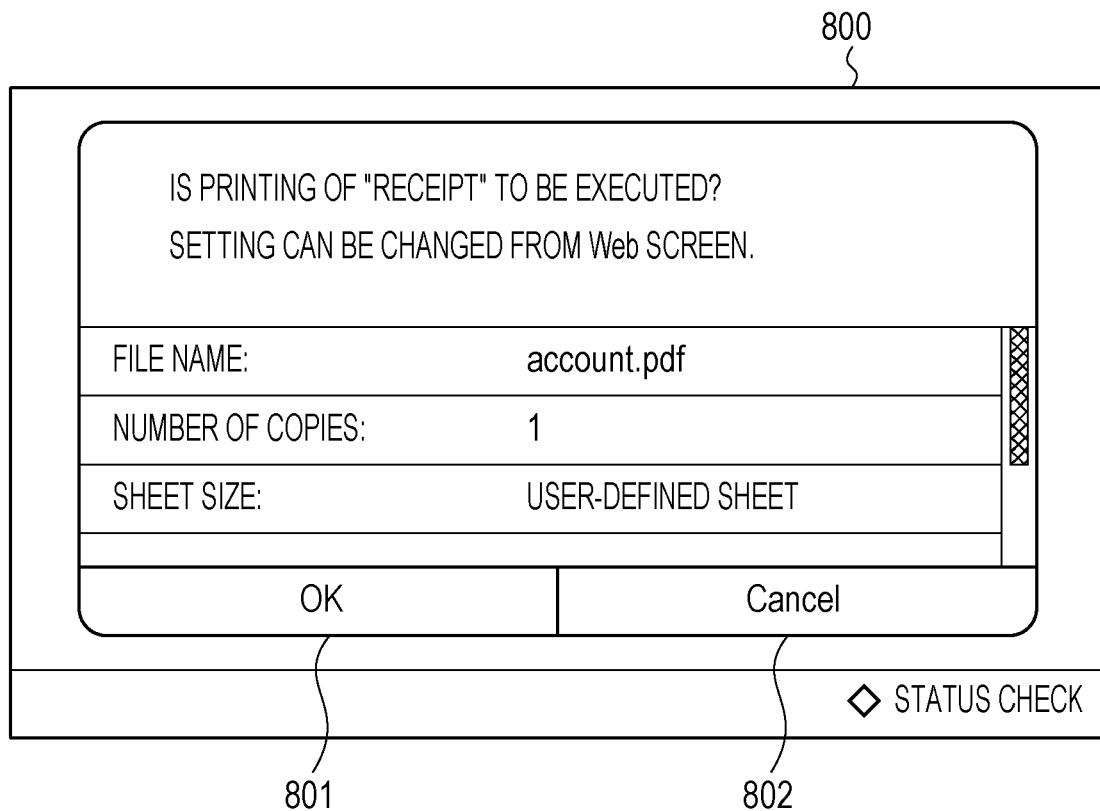
FIG. 8 illustrates an example of a printing screen.

When the button 701 illustrated in FIG. 7 is selected, a printing screen for instructing printing using the user-defined sheet is displayed. FIG. 8 illustrates an example of a printing screen. A printing screen 800 is drawn by the printing AP 313 which has been activated in response to a press of the button 701. The printing AP 313 according to the present exemplary embodiment displays contents of the button registered in the button registration screen 600 illustrated in FIG. 6 on the printing screen 800.

Figure 9:
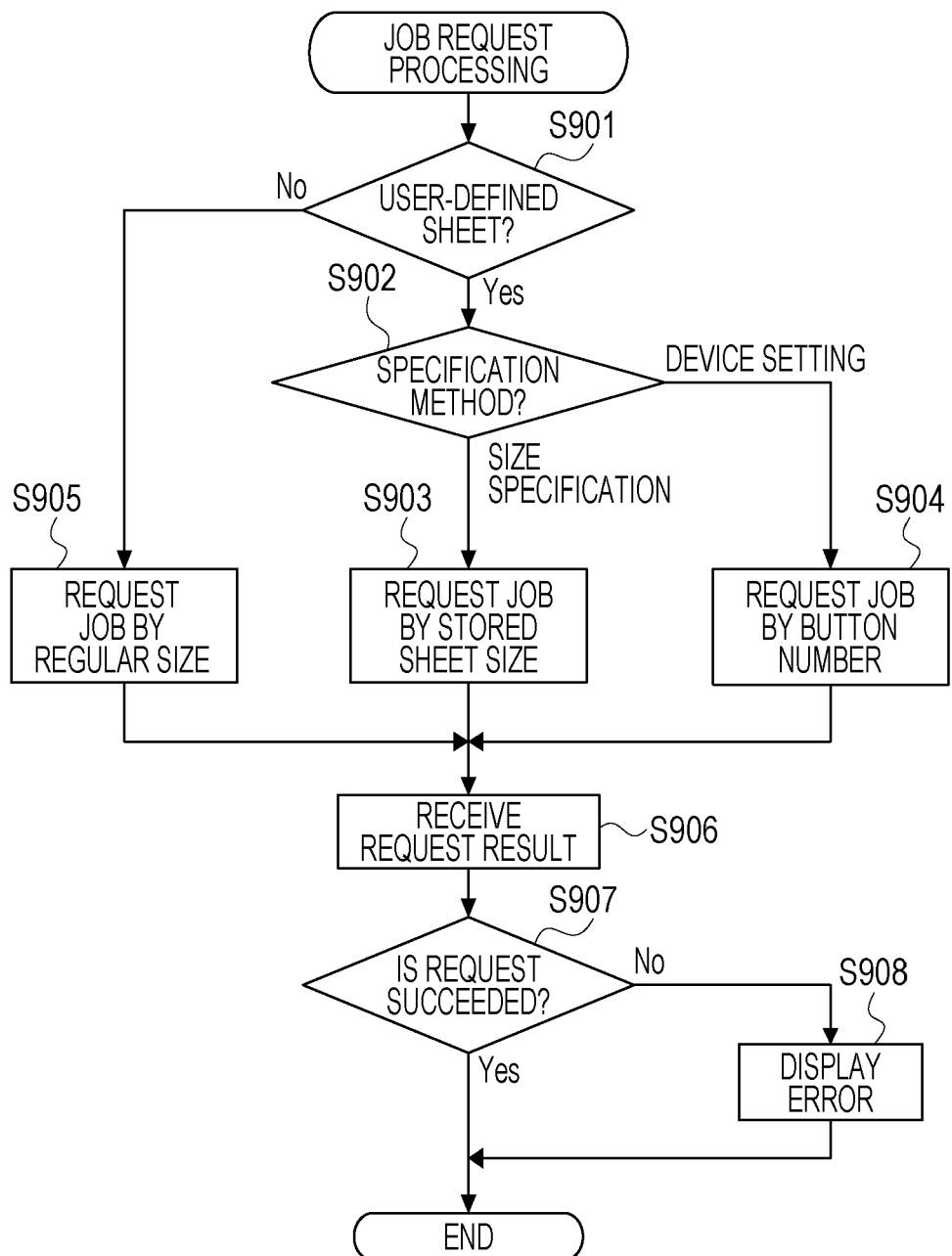
FIG. 9 is a flow chart illustrating job request processing.

FIG. 9 is a flow chart illustrating job request processing. The job request processing is processing realized by the printing AP 313 and is also processing executed by the CPU 101. The job request processing is started in a case where an OK button 801 is selected on the printing screen 800 illustrated in FIG. 8. It should be noted that, in a case where the OK button 801 is selected, the CPU 101 accepts a selection instruction of the sheet size of the user-defined sheet displayed on the printing screen 800. This processing is an example of the acceptance processing. In S901, the CPU 101 checks whether or not the sheet size displayed on the printing screen 800, that is, the sheet size stored in the storage 306 is the sheet size of the user-defined sheet. This corresponds to whether or not the user-defined sheet is selected in the sheet size field 610 on the button registration screen 600 illustrated in FIG. 6. In a case where the sheet size of the user-defined sheet is stored (S901: Yes), the CPU 101 advances the processing to S902. In a case where the sheet size of the user-defined sheet is not stored (S901: No), the CPU 101 advances the processing to S905.

In S902, the CPU 101 checks a specification method for the user-defined sheet. In a case where the specification method is a size specification (S902: size specification), the CPU 101 advances the processing to S903. In a case where the specification method is a device setting (S902: device setting), the CPU 101 advances the processing to S904. In S903, the CPU 101 requests the VM/FW 309 to generate a job by using the registered contents including the sheet size (width and height) stored in the storage 306 in S510 (FIG. 5). Thereafter, the CPU 101 advances the processing to S906. In S904, the CPU 101 requests the VM/FW 309 to generate a job by using the registered contents including the button number stored in the storage 306 in S511. Thereafter, the CPU 101 advances the processing to S906. In S905, the CPU 101 requests the VM/FW 309 to generate a job by using the regular size. Thereafter, the CPU 101 advances the processing to S906.

In S906, the CPU 101 receives a request result from the VM/FW 309. Next, in S907, the CPU 101 checks the request result. In a case where the request result is a success (S907: Yes), the CPU 101 ends the job request processing. In a case where the request result is a failure (S907: No), the CPU 101 advances the processing to S908. In S908, the CPU 101 displays an error of the job request and ends the job request processing.

Figure 10:
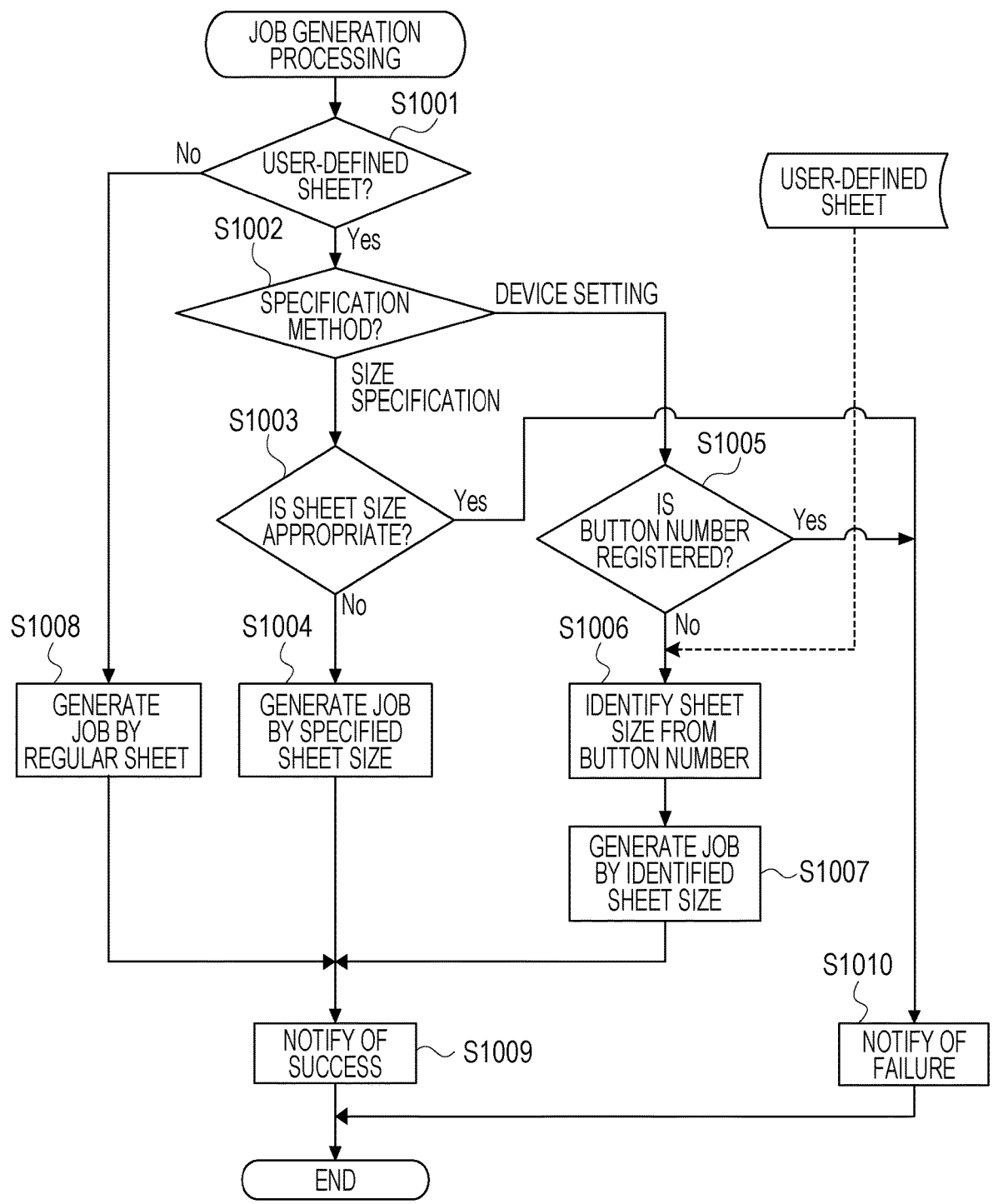
FIG. 10 is a flow chart illustrating job generation processing.

FIG. 10 is a flow chart illustrating job generation processing. The job generation processing is processing realized by the VM/FW 309 and also processing executed by the CPU 101. The job generation processing is started in a case where the job request is accepted in accordance with the processing in S903, S904, or S905 of FIG. 9. In S1001, the CPU 101 checks whether or not the job request is the job request using the user-defined sheet. In a case where the job request is the job request using the user-defined sheet (S1001: Yes), the CPU 101 advances the processing to S1002. In a case where the job request is not the job request using the user-defined sheet (S1001: No), the CPU 101 advances the processing to S1008.

In S1002, the CPU 101 checks the specification method for the sheet size of the user-defined sheet. In a case where the specification method is a size specification (S1002: size specification), the CPU 101 advances the processing to S1003. In a case where the specification method is a device setting (S1002: device setting), the CPU 101 advances the processing to S1005. It should be noted that the case of the size specification corresponds to S903 illustrated in FIG. 9 and is equivalent to the acceptance of the job request using the sheet size. On the other hand, the case of the device setting corresponds to S904 illustrated in FIG. 9 and is equivalent to the acceptance of the job request using the button number.

In S1003, the CPU 101 checks whether or not the sheet size is appropriate. In a case where the sheet size is appropriate (S1003: Yes), the CPU 101 advances the processing to S1004. In a case where is not appropriate the sheet size (1003: No), the CPU 101 advances the processing to S1010. In S1004, the CPU 101 generates the job by using the specified sheet size. Thereafter, the CPU 101 advances the processing to S1009.

In S1005, the CPU 101 checks whether or not the sheet size of the user-defined sheet is registered while being associated with the specified button number. In a case where the sheet size is registered (S1005: Yes), the CPU 101 advances the processing to S1006. In a case where the sheet size is not registered (S1005: No), the CPU 101 advances the processing to S1010.

In S1006, the CPU 101 identifies the sheet size on the basis of the button number. Specifically, the CPU 101 reads out the sheet size (width and height) associated with the specified button number from the user-defined sheet saving area of the eMMC 109 via the above-described data management module. Next, in S1007, the CPU 101 generates the job by using the identified sheet size and thereafter advances the processing to S1009. In S1008, the CPU 101 generates the job by using the specified regular sheet and thereafter advances the processing to S1009. In S1009, the CPU 101 notifies the request source of the success of the job generation and ends the job generation processing. In S1010, the CPU 101 notifies the request source of the failure of the job generation and ends the job generation processing.

As described above, the user can register the desired user-defined sheet without inputting the sheet size of the user-defined sheet on the application in the MFP 10 according to the present exemplary embodiment. Furthermore, it is possible to carry out the control such that the printing using the user-defined sheet is performed in accordance with the selection of the button associated with the registered user-defined sheet in the MFP 10.

In addition, it is possible to update (change) the user-defined sheet associated with the buttons 411 to 413 displayed on the sheet size registration screen 400 described with reference to FIG. 4 in the MFP 10 according to the present exemplary embodiment. For example, after the user-defined sheet is registered in the S1 button 411, the user registers a new user-defined sheet with respect to the S1 button 411 in accordance with the user operation onto the sheet size registration screen 400 (FIG. 4). In this case, the MFP 10 registers a sheet size of the new user-defined sheet while being associated with the button number of the S1 button 411. With this configuration, the sheet size after the change is automatically associated with the button name associated with the button number. With this configuration, in a case where the user-defined sheet is updated, the MFP 10 can control the printing using the user-defined sheet after the update.

In this manner, the MFP 10 can change the setting of the sheet size of the user-defined sheet by only changing the registered contents of the boot program without the user operation for changing the registered contents of the application. In this manner, it is possible to appropriately register the sheet size of the user-defined sheet without the complicated operation in the image forming apparatus where the application is operated on the firmware.

A first modified example of the present exemplary embodiment will be described. As described with reference to FIG. 5 and FIG. 6, the MFP 10 according to the exemplary embodiment can directly input the sheet size in the application. It should be noted however that the configuration is not limited to this, and a configuration may also be adopted in which the MFP 10 does not directly input the sheet size in the application as another example.

As a second modified example, according to the present exemplary embodiment, the MFP 10 previously registers the setting with regard to the printing request (printing condition) by the processing of the firmware in accordance with the user operation onto the button registration screen 600 described with reference to FIG. 6. It should be noted however that the timing for the registration of the printing condition is not limited to the exemplary embodiment. As another example, the CPU 101 may set the printing condition, for example, by selecting the user-defined sheet after the button 701 corresponding to the user-defined sheet illustrated in FIG. 7 is selected, or the like.

As a third modified example, according to the present exemplary embodiment, the MFP 10 displays the home screen 700 before the job request but may also perform the processing of the job request or the like without displaying the home screen 700.

As a fourth modified example, the MFP 10 may perform control to display a list such that three button numbers can be selected irrespective of the presence or absence of the registration in the button number selection field 624 in S505. It should be noted herein that, in a case where the button number is not registered, No is determined in S1005 (FIG. 10), and the failure notification is performed as the request result of the job. Furthermore, according to this modified example, the processing in S501 and S502 may be omitted.

According to the present exemplary embodiment, it is possible to appropriately register the sheet size of the user-defined sheet without the complicated operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-169570, filed Sep. 4, 2017, which is hereby incorporated by reference herein in its entirety.

What is claimed is:

1. An image forming apparatus comprising: at least one or more memory which stores:
   firmware;
   an interpreter;
   an application operating on the interpreter and framework program which provides API (Application Program Interface) for the application, wherein a code in the application is interpreted to execute an operation to the image forming apparatus;
   a first registration unit configured to register a customized size of a sheet in a storage unit in-accordance with an input regarding a size information by a user operation under control of the firmware;
   a first acceptance unit configured to accept, in accordance with executing the application operating on the interpreter, a selection instruction of an item corresponding to the customized size of the sheet registered by the first registration unit in accordance with the user operation wherein the information regarding the customized size of the sheet is notified from the firmware by using the API in the framework program to the application and stored for the selection by the application; and
   a control unit configured to control printing using the defined sheet having the customized size according to the selection instruction under the control of the firmware.

2. The image forming apparatus according to claim 1, further comprising:
  a second registration unit configured to register first identification information for identifying the sheet of the customized size in the storage unit while being associated with the customized size registered by the first registration unit under the control of the application,
  wherein the first acceptance unit accepts a selection instruction of the first identification information, and
  wherein the control unit controls the printing using the sheet having the customized size associated with the first identification information according to the selection instruction.

3. The image forming apparatus according to claim 2, wherein, in a case where the customized size associated with the first identification information is updated, the control unit controls the printing using the sheet having the updated customized size associated with the first identification information according to the selection instruction.

4. The image forming apparatus according to claim 2, wherein the first registration unit registers the customized size while being associated with second identification information for identifying the sheet, the image forming apparatus further comprising:
  a second acceptance unit configured to accept a selection instruction of the second identification information in accordance with the user operation under the control of the application, and
  wherein the second registration unit registers the first identification information while being associated with the customized size associated with the second identification information according to the selection instruction.

5. The image forming apparatus according to claim 1, wherein the first acceptance unit further accepts a printing condition according to the printing using the sheet having the customized size according to the selection instruction, and
  wherein the control unit controls the printing in accordance with the printing condition accepted by the first acceptance unit.

6. A control method for an image forming apparatus including firmware and an interpreter, an application operating on the interpreter, and framework program which provides API (Application Program Interface) for the application, wherein a code in the application is interpreted to execution to the image forming apparatus, the control method comprising:
  registering a customized size of a sheet in a storage unit in accordance with an input regarding a size information by a user operation under control of the firmware;
  accepting, in accordance with executing the application operating on the interpreter, a selection instruction of an item corresponding to the customized size of the sheet in accordance with the user operation, wherein the information regarding the customized size of the sheet is notified from the firmware by using the API in the framework program to the application and stored for the selection by the application; and
  controlling printing using the sheet having the size according to the selection instruction under the control of the firmware.

7. A non-transitory storage medium that stores a program for causing a computer of an image forming apparatus to function as the respective units of the image forming apparatus comprising:
  firmware;
  an interpreter;
  an application operating on the interpreter and framework program which provides API (Application Program Interface) for the application, wherein a code in the application is interpreted to execute an operation to the image forming apparatus;
  a first registration unit configured to register a customized size of a sheet in a storage unit in accordance with an input regarding a size information by a user operation under control of the firmware;
  a first acceptance unit configured to accept, in accordance with executing the application operating on the interpreter, a selection instruction of an item corresponding to the customized size of the sheet registered by the first registration unit in accordance with the user operation wherein the information regarding the customized size of the sheet is notified from the firmware by using the API in the framework program to the application and stored for the selection of the application; and
  a control unit configured to control printing using the sheet having the customized size according to the selection instruction under the control of the firmware.

* * * * *